Figure 1:
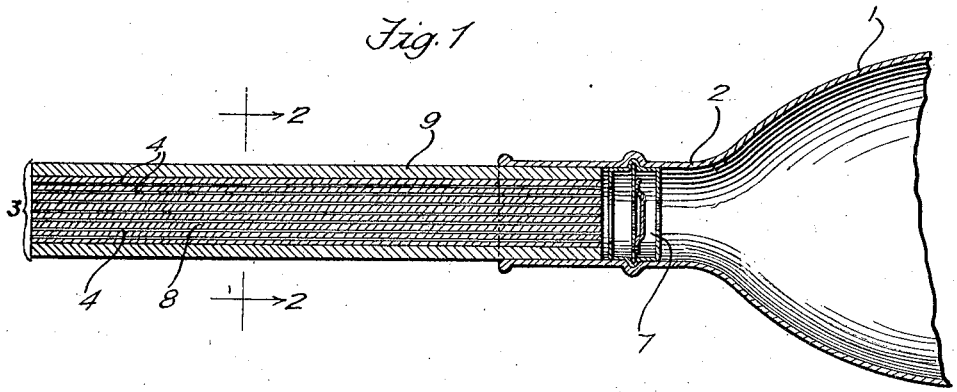

Nov. 27, 1923.  1,475,588

J. J. LOZOWSKY

TOY

Filed Sept. 17, 1923

INVENTOR
Julius J. Lozowsky
BY John W. Thompson
his ATTORNEY

Patented Nov. 27, 1923.

1,475,588

UNITED STATES PATENT OFFICE.

JULIUS J. LOZOWSKY, OF BROOKLYN, NEW YORK.

TOY.

Application filed September 17, 1923. Serial No. 663,021.

*To all whom it may concern:*

Be it known that I, JULIUS J. LOZOWSKY, a citizen of the United States, and a resident of the borough of Brooklyn, county of Kings, and State of New York, have invented an Improvement in Toys, of which the following is a specification.

The present invention relates to an improvement in toys and more particularly to a toy balloon construction. One object of the invention has been to provide an article of the kind referred to which will embody all of the attractive features of a toy balloon and which will also have the additional feature of an edible mouthpiece through which the balloon can be inflated and which may thereafter be consumed or otherwise disposed of. A preferred embodiment of my invention is illustrated in the drawings accompanying the present specification in which—

Figure 2:
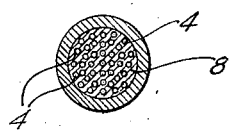

Figure 1 is a central longitudinal section,

Figure 2, a transverse section on the line 2—2 of Figure 1, and

Figure 3:
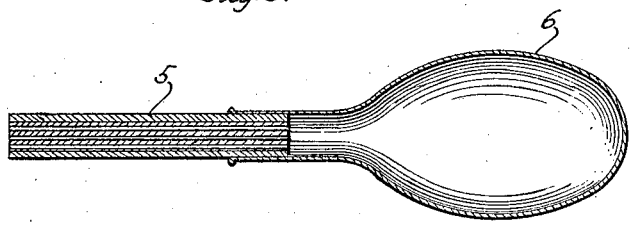

Figure 3, a sectional view of a modified form.

A preferred embodiment of my invention, as illustrated in the drawings, comprises an inflatable member such as a toy balloon 1 of any desired shape or size provided with a neck 2. One end of a mouthpiece 3 is inserted in the open end of the neck 2, said mouthpiece being made preferably of an edible material such as candy and having a passageway or passageways 4 to provide a conduit for admitting air to the balloon. In the modification shown in Figure 3, the passageways of the mouthpiece 5 communicate directly with the interior of the balloon 6. For sanitary reasons, however, it will be preferable to prevent discharge of the air in the balloon through the edible mouthpiece by employing a suitable valve as 7, or other equivalent device, said valve being conveniently positioned in the neck 2 between the engaged end of the mouthpiece and the interior of the balloon.

While various kinds of edible confections may be employed in making the mouthpiece, candy in stick form and having an opening or openings extending longitudinally therethrough will be found advantageous. As shown in Figures 1 and 2, the candy mouthpiece has a core 8 of cellular structure or character providing a plurality of longitudinally extending openings, forming the passageways 4 said core being surrounded peripherally by a coating or cover 9 of relatively impervious material, either edible or inedible. For example, the whole mouthpiece may be candy or the core may be candy with a paper wrapping or other suitable protective covering or coating capable of being removed as the candy is consumed.

The toy hereinabove described provides an article of commerce which will be attractive to children. The balloon can be inflated by blowing through the candy and can be retained in inflated condition either by tying a string around the neck or by operation of the valve or other check where such is used.

It is contemplated that the most satisfactory results can be secured in the use of a mouthpiece made of candy having the cellular structure hereinabove described and with enough openings extending through the stick or piece from end to end to permit free passage of air through the mouthpiece.

I claim as my invention:

1. The combination of a toy balloon having an inlet neck, a candy mouthpiece provided with a conduit for admitting air to the balloon, one end of said mouthpiece operatively engaging the free end of said neck, and a check valve positioned in said neck between the engaged end of the mouthpiece and the interior of the balloon whereby the engaged end of said mouthpiece may be relieved of back pressure from the interior of said balloon.

2. A toy comprising an inflated member and an edible mouthpiece provided with a conduit communicating with the interior of the inflatable member, said mouthpiece having an inedible protective covering interposed between said inflatable member and the conduit of the mouthpiece, and exposing an open end of said conduit toward the interior of said inflatable member.

In testimony whereof, I have signed my name to this specification this 6th day of September, 1923.

JULIUS J. LOZOWSKY.